(12) United States Patent
Cherp

(10) Patent No.: US 12,448,166 B1
(45) Date of Patent: Oct. 21, 2025

(54) VISCOUS MATERIAL RECOVERY SYSTEM

(71) Applicant: OPTIMUM SOLUTIONS, LLC, Wesley Chapel, FL (US)

(72) Inventor: Christopher Cherp, Wesley Chapel, FL (US)

(73) Assignee: OPTIMUM SOLUTIONS, LLC, Wesley Chapel, FL (US)

( * ) Notice: Subject to any disclaimer, the term of this patent is extended or adjusted under 35 U.S.C. 154(b) by 154 days.

(21) Appl. No.: 18/232,696

(22) Filed: Aug. 10, 2023

Related U.S. Application Data

(60) Provisional application No. 63/396,627, filed on Aug. 10, 2022.

(51) Int. Cl.
| | | |
|---|---|---|
| *B65B 67/12* | (2006.01) | |
| *B04B 5/02* | (2006.01) | |
| *B04B 5/04* | (2006.01) | |
| *B65B 43/60* | (2006.01) | |
| *A47J 31/06* | (2006.01) | |
| *B65B 67/06* | (2006.01) | |

(52) U.S. Cl.
CPC ............ *B65B 67/1211* (2013.01); *B04B 5/02* (2013.01); *B04B 5/04* (2013.01); *B65B 43/60* (2013.01); *A47J 31/06* (2013.01); *B65B 67/06* (2013.01); *B65B 2067/1283* (2013.01); *B65B 2230/02* (2013.01)

(58) Field of Classification Search
CPC ..... B65B 67/1211; B65B 43/60; B65B 67/06; B65B 67/1283; B04B 5/04; B04B 5/0428
USPC .................................................. 141/364–366
See application file for complete search history.

(56) References Cited

U.S. PATENT DOCUMENTS

| | | | |
|---|---|---|---|
| 1,921,680 A | | 8/1933 | Kopnicky |
| 5,215,133 A | * | 6/1993 | Lambert ................... A47K 1/09 |
| | | | 222/181.3 |
| 5,794,671 A | * | 8/1998 | Smith ..................... B65B 69/00 |
| | | | 141/366 |
| 7,282,018 B2 | | 10/2007 | Priest, III |
| 9,085,376 B2 | | 7/2015 | Cummins |
| 9,776,788 B2 | | 10/2017 | Gerbaulet et al. |
| 2007/0141876 A1 | | 6/2007 | Lown et al. |
| 2011/0045151 A1 | | 2/2011 | Padan et al. |
| 2014/0105665 A1 | | 4/2014 | Wright et al. |

* cited by examiner

*Primary Examiner* — Jason K Niesz
(74) *Attorney, Agent, or Firm* — MALLOY & MALLOY PL

(57) ABSTRACT

A viscous material recovery system allows a user to quickly and easily recover viscous material agglomerated proximate a bottom of a container and includes a collection assembly having a collection unit with a container receiving end and an oppositely disposed collection end including a collection reservoir. A recovery assembly includes a recovery unit having a sleeve with a proximal end with a proximal opening therethrough and an oppositely disposed distal end. In use, the user operatively positions the collection unit, having the container with the viscous material therein, into the recovery unit. Next, the user spins the recovery unit having the collection unit with the container operatively positioned therein along and around a circular path about 10 revolutions to about 15 revolutions such that centrifugal force causes the agglomerated viscous material to move from proximate the container bottom to proximate the container neck for transfer therethrough.

17 Claims, 6 Drawing Sheets

VISCOUS MATERIAL RECOVERY SYSTEM

CROSS-REFERENCE TO RELATED APPLICATIONS

This application claims the benefit of U.S. Provisional Patent Application 63/396,627, filed on Aug. 10, 2022, respectively, which is incorporated by reference herein in its entirety.

FIELD OF THE INVENTION

The present invention relates generally to a viscous material recovery system to allow a user to recover viscous material from a container.

BACKGROUND OF THE INVENTION

Viscous materials comprise a wide range of products which people use in their everyday lives. In general, viscous materials are those which do not flow freely from whatever type of container they are normally supplied in, and they range from food products, to cleaning products, adhesives, oils, beauty products, etc.

Some examples of viscous materials that people use on a regular, if not daily, basis include, but are in no manner limited to, condiments such as ketchup and mustard, honey, adhesives such as glues and epoxies, liquid soaps, body lotions, cosmetics, paints, oils for cooking or lubricating machinery, etc., just to name a few.

Given the common occurrence and usage of viscous materials, a number of methods have been attempted over the years to extract the remaining amounts of viscous materials which often agglomerate in the bottom of the containers they are provided in, which can range from ketchup bottles to gallon containers of paints, oils, etc.

Likely the method familiar to most people is holding a ketchup bottle upside down and smacking the bottom with one's hand in an attempt to force the remaining amounts of ketchup out of the bottle. However, as anyone who has attempted this knows, it is highly susceptible to making a mess as ketchup is ejected out of the bottle onto the surrounding area with little, if any, actually landing on the desired food item or serving plate.

As liquid soaps in pump bottles become more and more prevalent for use in kitchens and bathrooms, most people are also likely familiar with a measurable amount of liquid soap remaining in the bottle which is no longer pumpable, and which does not readily flow out of the bottle under gravity. As such, some people attempt to balance a near empty bottle over a new bottle to allow the remaining liquid soap to flow from one to the other. This requires a lot of time and considerably accurate balancing skills that not everyone possesses, thus, often resulting in the near empty bottle becoming dislodged and falling, thus defeating the purpose, and again, potentially making a mess. Similar tactics are employed with body lotions, cooking oils, etc.

As the viscosity of a material generally decreases with temperature, another method employed to extract residual viscous material from a container involves the application of heat, either directly to the container or via a heated bath, such as a heated pot or pan of water. While this can prove effective in some cases, it can be dangerous, and in some instances hazardous. If the container is not properly vented, gasses emitted from the heated viscous materials and/or containers can create pressure in the container causing it to fail, possibly in an explosive manner. Further, certain viscous materials may degrade or even decompose to the point they are no longer useful, once again, defeating the purpose, unless the amount of heat applied is closely and carefully regulated. However, it is believed highly unlikely the average person has any idea how much heat or for how long commonly used viscous materials may be safely heated or for how long before the degrade, decompose, or worse, explode.

Accordingly, there is an established need for a solution to one or more of the aforementioned shortcomings in the current state of the art.

SUMMARY OF THE INVENTION

The present invention is directed generally to a viscous material recovery system to allow a user to recover viscous material from a container.

In a first implementation of the invention, a viscous material recovery system to allow a user to quickly and easily recover viscous material agglomerated proximate a bottom of a container having a container bottom and an oppositely disposed container neck defining a container volume thereinbetween, and a container opening through the container neck, comprises: a collection assembly comprising a collection unit having a container receiving end dimensioned and configured to receive the container therethrough and an oppositely disposed collection end comprising a collection reservoir; and, a recovery assembly comprising a recovery unit having a sleeve with a proximal end and a proximal opening through the proximal end dimensioned and configured to receive the collection unit having the container positioned therein, and an oppositely disposed distal end having a distal aperture disposed through a portion thereof, wherein the user inserts the collection unit having the container containing the viscous material operatively positioned therein into the recovery unit through the proximal opening and towards the distal end thereof with a portion of the collection end of the collection unit disposed through the distal aperture of the recovery unit, and wherein the user spins the recovery unit having the collection unit with the container positioned therein along and around a circular path about 10 revolutions to about 15 revolutions such that centrifugal force causes the agglomerated viscous material to move from proximate the container bottom to proximate the container neck for transfer through the container opening into the collection reservoir.

In a second aspect, the viscous material recovery system can include a collection unit having a side wall disposed between a container receiving end and a collection end.

In another aspect, the viscous material recovery system may have a side wall constructed of a flexible material.

In a further aspect, the viscous material recovery system can include a side wall constructed of a fluid resistant material.

In one other aspect, the viscous material recovery system may have a collection assembly including a distal tip, wherein the distal tip is inserted through a distal aperture of a recovery unit.

In yet another aspect, the viscous material recovery system may be utilized with a viscous material wherein an amount of the viscous material is transferred through a container opening in a container neck into a collection reservoir of a collection unit when a user spins a recovery unit having the container positioned in the collection assembly around and along a circular path.

In still one further aspect, the viscous material recovery system may have a collection assembly including a closure formed between a container receiving end and a collection reservoir after an amount of viscous material is transferred from a container into the collection reservoir.

In yet one other aspect, the viscous material recovery system can include a distal tip which is detachable from a collection end of a collection unit thereby forming a dispensing aperture through the collection end such that a user may dispense a viscous material from the collection reservoir through the dispensing aperture as needed for use.

In still another aspect, the viscous material recovery system may have a recovery unit including a sleeve disposed between a proximal end and a distal end.

In yet one further aspect, the viscous material recovery system can include a sleeve constructed of a flexible material of construction.

In still one other aspect, the viscous material recovery system may have a sleeve constructed of a resilient material of construction.

In yet another aspect, the viscous material recovery system can include a sleeve constructed of an elastic material of construction.

In still one further aspect, the viscous material recovery system may have a distal aperture formed through a distal edge disposed along a distal end of a recovery unit.

In a second implementation of the invention, a viscous material recovery system to allow a user to quickly and easily recover viscous material agglomerated proximate a bottom of a container having a container bottom and an oppositely disposed container neck defining a container volume therebetween, and a container opening through the container neck, comprises: a collection assembly comprising a collection unit having a container receiving end dimensioned and configured to receive the container therethrough and an oppositely disposed collection end comprising a collection reservoir; the collection unit comprising a side wall disposed between the container receiving end and the collection end, and; a recovery assembly comprising a recovery unit having a sleeve with a proximal end and a proximal opening through the proximal end dimensioned and configured to receive the collection unit having the container positioned therein, and an oppositely disposed distal end having a distal aperture formed through a distal edge disposed along the distal end, the recovery unit comprises a sleeve disposed between the proximal end and the distal end, wherein the user inserts the collection unit having the container containing the viscous material operatively positioned therein into the recovery unit through the proximal opening and towards the distal end thereof with a portion of the collection end of the collection unit disposed through the distal aperture of the recovery unit, and wherein the user spins the recovery unit having the collection unit with the container positioned therein along and around a circular path about 10 revolutions to about 15 revolutions such that centrifugal force causes the agglomerated viscous material to move from proximate the container bottom to proximate the container neck for transfer through the container opening into the collection reservoir.

In one alternative implementation of the invention, a viscous material recovery system to allow a user to quickly and easily recover viscous material agglomerated proximate a bottom of a container having a container bottom and an oppositely disposed container neck defining a container volume therebetween, and a container opening through the container neck, comprises: a recovery assembly comprising a recovery unit having a proximal end and a proximal opening dimensioned and configured to receive the container positioned therein and an oppositely disposed distal end; and, the recovery unit comprises a sleeve constructed of a resilient material disposed between the proximal end and the distal end, wherein the user inserts the container containing the viscous material into the recovery unit through the proximal opening and operatively positions the container proximate the distal end thereof, and the user spins the recovery unit having the container operatively positioned therein along and around a circular path about 10 revolutions to about 15 revolutions such that centrifugal force causes the agglomerated viscous material to move from proximate the container bottom to proximate the container neck, such that the user may dispense the viscous material from the container through the container opening in the container neck for use, as needed.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward to a viscous material recovery system to allow a user to recover viscous material from a container. As used herein, viscous material includes any substance that does not readily flow via gravity through a container to be dispensed therefrom and includes, but is in no manner limited too, condiments, such as ketchup and mustard, honey, adhesives, such as glues and epoxies, liquid soaps, body lotions, cosmetics, paint, oils, etc., just to name a few.

Figure 1:
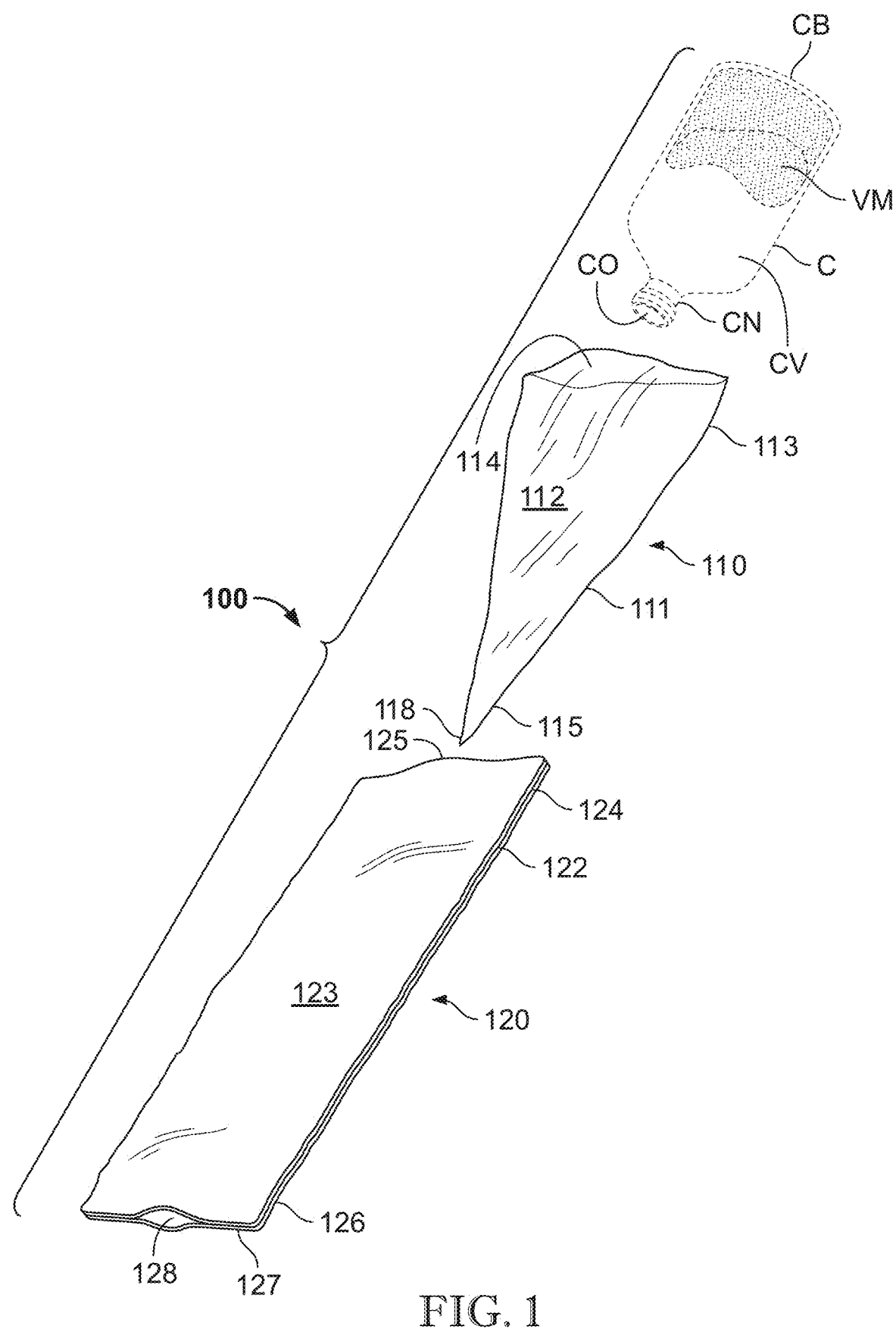
FIG. 1 presents an exploded perspective view of one illustrative embodiment of a viscous material recovery system, in accordance with the present invention.

Referring initially to FIG. 1, presented therein is an exploded perspective view of one illustrative embodiment of a viscous material recovery system, generally as shown as at 100 throughout the figures, in accordance with the present invention. A viscous material recovery system 100 in at least one embodiment includes a collection assembly 110 and a cooperatively structured recovery assembly 120.

A collection assembly 110 includes a collection unit 111 having a container receiving end 113 and an oppositely disposed collection end 115. A container receiving end 113 is dimensioned and configured to receive a container, having an amount of viscous material contained therein, therethrough and into the collection unit 111. A collection unit 111 is formed of a side wall 112 disposed between a container receiving end 113 and an oppositely disposed collection end 115. A collection reservoir 116 is formed proximate a collection end 115 of a collection unit 111. In at least one embodiment, a collection end 115 terminates in a distal tip 118. As shown in FIG. 1, in at least one embodiment, a collection unit 111 comprises a generally conical configuration. It is to be appreciated that a collection unit 111 in accordance with the present invention may comprise other geometric configurations including but not limited to square, rectangular, oval, etc., just to name a few. It is to be further appreciated that a collection unit 111 may be constructed having larger overall dimensions so as to accommodate larger containers, or a collection unit 111 may be constructed having smaller overall dimensions so as to accommodate smaller containers. Stated otherwise, a collection unit 111 in accordance with the present invention may be constructed having a variety of overall dimensions as needed to accommodate any of a wide variety of container shapes and sizes.

A side wall 112 in accordance with at least one embodiment of the present invention is constructed of a flexible material, so as to accommodate a wide variety of containers having different configurations and sizes. In one further embodiment, a side wall 112 is constructed of a fluid resistant material such that viscous material transferred from a container into a portion of a collection unit 111 does not penetrate through the side wall 112 in any appreciable amount. In at least one embodiment, a side wall 112 is constructed of plastic, polyester, nylon and/or plastic lined canvas or cotton.

A collection unit 111 of a collection assembly 110 in accordance with the present invention further comprises a receiving end opening 114 formed through a container receiving end 113. With reference once again to FIG. 1, in at least one embodiment, a receiving end opening 114 is dimensioned and configured to receive the container C therethrough and into the collection unit 111. FIG. 1 presents a representative container C for use with the present invention. A container C includes a container bottom CB and an oppositely disposed container neck CN which at least partially define a container volume CV disposed therebetween. As further shown in FIG. 1, the container C includes a container opening CO formed through the container neck CN to allow the viscous material VM to be dispensed therethrough. As shown in FIG. 1, container C comprises a generally rectangular configuration, however, it is to be appreciated that the present viscous material recovery system 100 may be utilized with any of a variety of containers having any of a variety of geometric configurations and/or dimensions.

As disclosed hereinabove, a viscous material recovery system 100 in accordance with at least one embodiment of the present invention further comprises a recovery assembly 120. A recovery assembly 120 includes a recovery unit 122 includes a sleeve 123 having a proximal end 124 and an oppositely disposed distal end 126. A recovery unit 122 in at least one embodiment comprises an elongated configuration between the proximal end 124 and the oppositely disposed distal end 126. In at least one embodiment, a sleeve 123 of a recovery unit 122 in accordance with the present invention is about twenty-four inches in length and about six inches in width. It is to be appreciated, however, that it is within the scope and intent of the present invention for a sleeve 123 of a recovery unit 122 to have larger dimensions, to accommodate larger containers, or smaller dimensions, to accommodate smaller containers.

A sleeve 123 of a recovery unit 122 in at least one embodiment is constructed of a flexible material, as before, so as to accommodate a wide variety of containers having different configurations and sizes. By way of example only, a sleeve 123 of a recovery unit 122 may be constructed of the fabric such as cotton, polyester, nylon, etc., just to name a few. In at least one further embodiment, a sleeve 123 of a recovery unit 122 is constructed of a resilient or elastic material, once again, so as to accommodate a wide variety of containers having different configurations and sizes. More in particular, a sleeve 123 of a recovery unit 122 may be constructed of rubber, silicone, nitrile, neoprene and/or vinyl, just to name a few.

A recovery unit 122 of the present viscous material recovery system 100 includes a proximal opening 125 disposed along a proximal end 124 thereof. More in particular, in at least one embodiment, a proximal opening 125 of a recovery unit 122 is dimensioned and configured to receive a collection unit 111 having a container C, comprising an amount of viscous material therein, therethrough and into the recovery unit 122. A recovery unit 122 further comprises a distal end 126 having a distal edge at 127 formed therealong. With reference once again to the illustrative embodiment of FIG. 1, in at least one embodiment, a recovery unit 122 further comprises a distal aperture 128 disposed along a portion of a distal edge 127 of a distal end 126 thereof.

Having now disclosed the components of at least one illustrative embodiment of a viscous material recovery system 100 in accordance with the present invention, i.e., a collection assembly 110 and a recovery assembly 120, as shown in FIG. 1, operation of the present embodiment shall be described. To begin, a user places a container C having an amount of viscous material VM agglomerated proximate a container bottom CB through a receiving end opening 114 along a container receiving end 113 of a collection unit 111 with the container neck CN with the container cap (not shown) removed therefrom and operatively positioned downwardly into the collection end 115 of the collection unit 111, such as is shown best in the illustrative embodiment of FIG. 3. Next, the collection unit 111 having the container C with the viscous material VM therein is operatively positioned through the proximal opening 125 in the proximal end 124 of the recovery unit 122, once again, with the container neck CN positioned downwardly into the recovery unit 122 towards the distal end 126 thereof. As further shown in FIG. 3, a portion of the collection end 115 of the collection unit 111 is pulled through the distal aperture 128 in the distal edge 127 of the recovery unit 122, such that the collection reservoir 116 of the collection unit 111 is disposed externally from the recovery unit 122.

Figure 2:
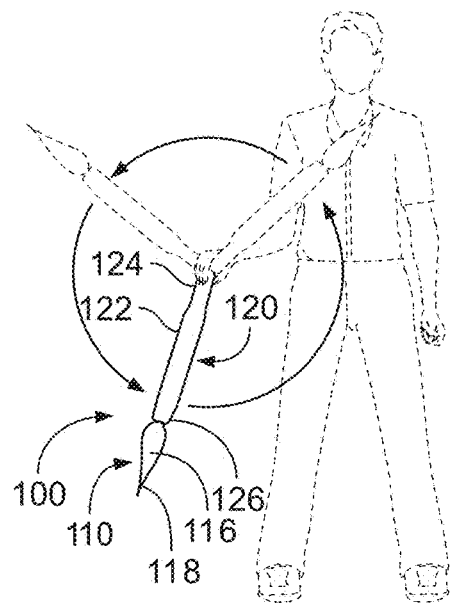
FIG. 2 presents a perspective view of a user operating the viscous material recovery system of FIG. 1, in accordance with the present invention.
Figure 3:
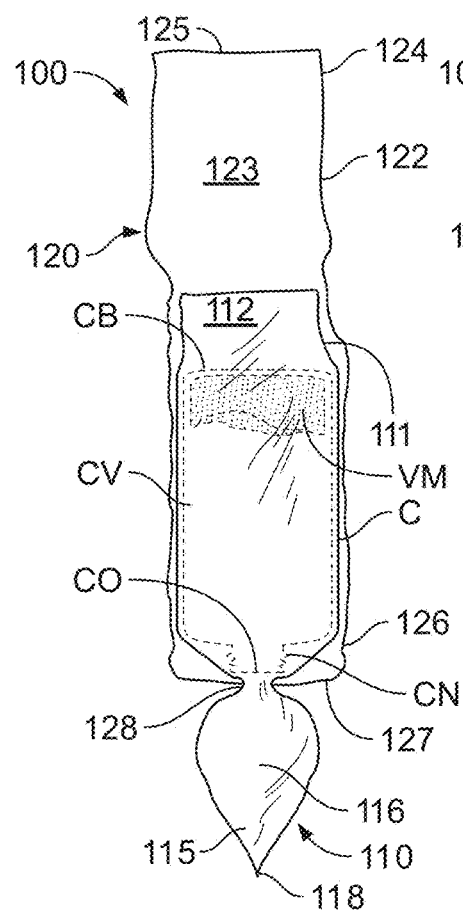
FIG. 3 presents a cutaway perspective view of the viscous material recovery system of FIG. 1 having a container operatively positioned therein showing a viscous material agglomerated proximate the container bottom prior to operation thereof by a user, in accordance with the present invention.

Once the collection unit 111 having the container C with the viscous material VM therein is operatively positioned into the recovery unit 122, as shown best in FIG. 3, a user grasps one end of the present viscous material recovery system 100. More in particular, and with reference next to the illustrative embodiment of FIG. 2, the user grasps the proximal end 124 of the recovery unit 122 and spins the recovery unit 122, and thus, the container C with the viscous material VM therein, along and around a circular path for about 10 revolutions to about 15 revolutions. As will be appreciated, the number of revolutions necessary to transfer the amount of viscous material VM which has agglomerated proximate the container bottom CB through the container opening CO of the container neck CN and into a collection reservoir 116 of a collection unit 111 will be dependent upon the amount and viscosity of the viscous material VM in the container C.

Figure 4:
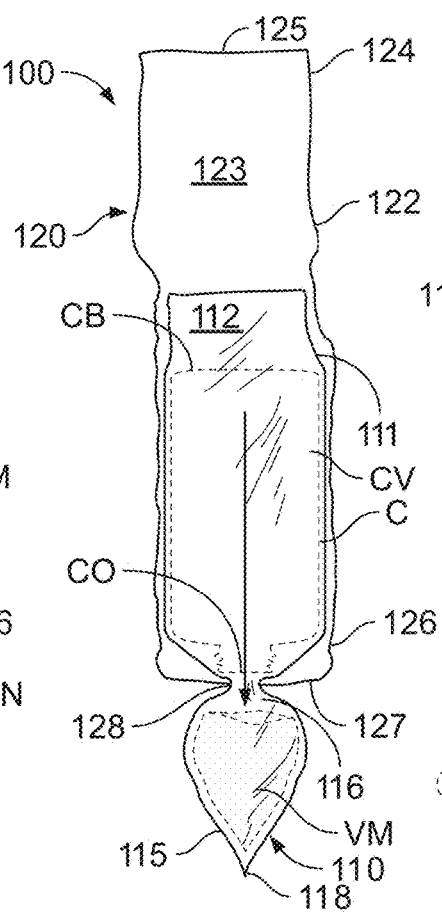
FIG. 4 presents a cutaway perspective view of the viscous material recovery system of FIG. 3 showing the viscous material transferred into a collection reservoir of a collection unit after operation thereof by the user, in accordance with the present invention.

After spinning the recovery unit 122 with the container C having viscous material VM agglomerated proximate the container bottom CB along and around a circular path for a sufficient number of revolutions, the viscous material VM is transferred from the container C through the container opening CO of the container neck CN into the collection reservoir 116 proximate the collection end 115 of the collection unit 111, as is shown best in the illustrative embodiment of FIG. 4. The collection unit 111 is removed from the recovery unit 122 through the distal aperture 128 formed through the distal edge 127 of the recovery unit 122, leaving the now essentially empty container C in the recovery unit 122 from which it may be removed for proper disposal.

Figure 5:
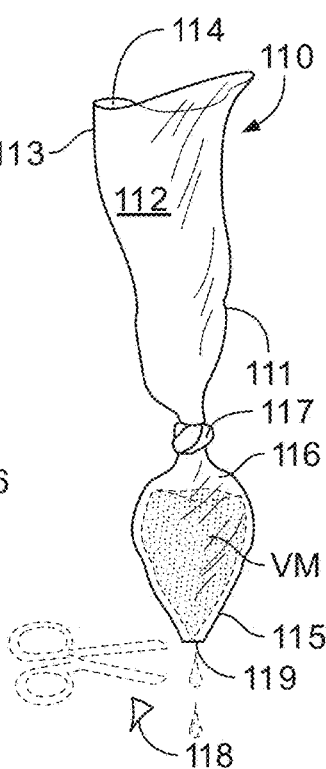
FIG. 5 presents a perspective view of a collection assembly of the viscous material recovery system of FIG. 4 showing the viscous material in the collection reservoir of the collection unit having a distal tip of the collection unit detached therefrom to allow a user to dispense the viscous material therefrom for use, as needed, in accordance with the present invention.

Finally, and with reference to the illustrative embodiment of FIG. 5, a closure 117 is formed between the container receiving end 113 and a collection reservoir 116 of the collection unit 111, now containing the amount of viscous material VM, such as by tying a knot thereinbetween, so as to prevent the viscous material VM from flowing out the receiving end opening 114 of the collection unit 111. The distal tip 118 of the collection unit 111 is detached from the collection end 115 thereof, such as by cutting with scissors, thereby allowing the user to dispense the viscous material VM from the collection reservoir 116 of the collection unit 111, as needed.

Figure 6:
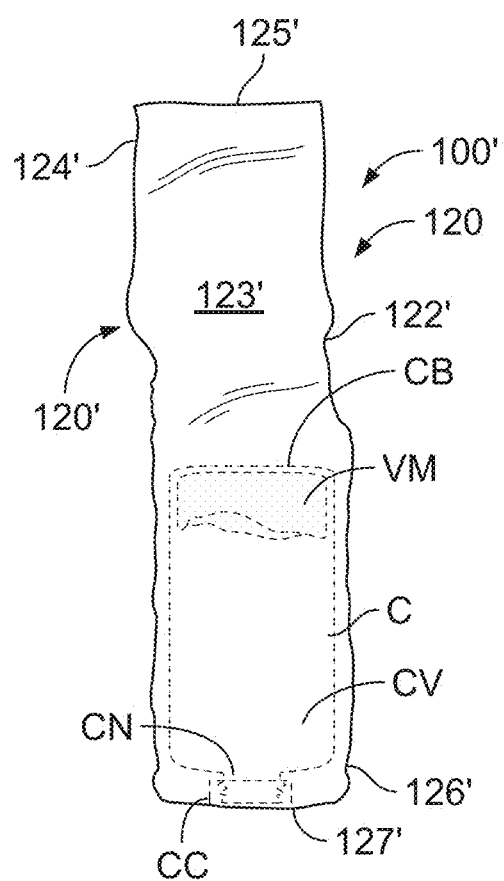
FIG. 6 presents a cutaway perspective view of one alternate embodiment of a viscous material recovery system having a container operatively positioned therein and showing a viscous material agglomerated proximate the container bottom prior to operation thereof by a user, in accordance with the present invention.
Figure 7:
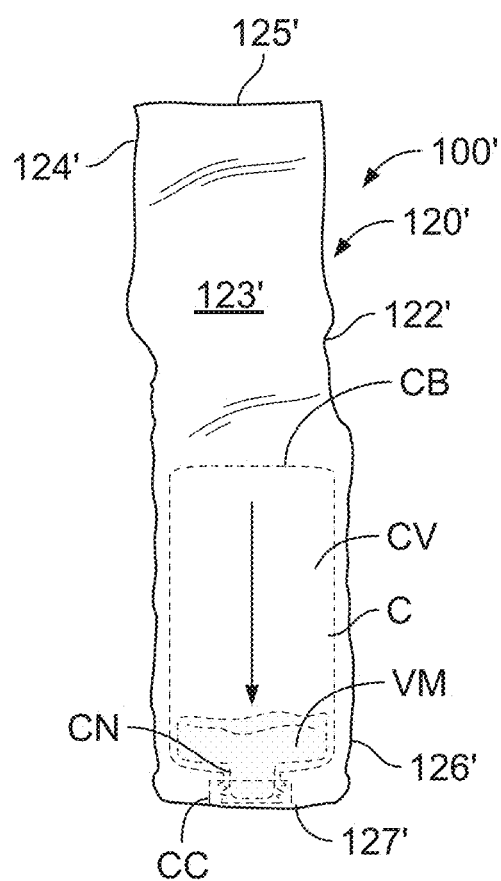
FIG. 7 presents a cutaway perspective view of the alternate embodiment of the viscous material recovery system of FIG. 6 showing the viscous material transferred from proximate the container bottom to proximate the container neck to allow the user to dispense the viscous material therethrough for use, as needed, in accordance with the present invention.

At least one alternative embodiment is contemplated in addition the embodiment disclosed and described hereinabove. More in particular, FIGS. 6 and 7 present cutaway perspective views of one alternative embodiment of a viscous material recovery system 100' having a container C operatively positioned therein. Specifically, FIG. 6 presents a cutaway perspective view the alternative embodiment of a viscous material recovery system 100' having a container C with a container cap CC secured thereon operatively positioned therein and showing a viscous material VM agglomerated proximate a container bottom CB prior to operation thereof by a user, and, FIG. 7 presents a cutaway perspective view of the alternative embodiment of the viscous material recovery system 100' of FIG. 6 showing the viscous material VM transferred from proximate the container bottom CB to proximate the container neck CN to allow the user to dispense the viscous material therethrough for use by simply removing the container cap CC, as needed, in accordance with the present invention.

As is evident from FIGS. 6 and 7, the alternative embodiment of a viscous material recovery system 100' does not require a collection assembly 110 as disclosed and described hereinabove with reference to the previous embodiment of the present invention.

As before, the alternative embodiment of a viscous material recovery system 100' includes a recovery assembly 120'. A recovery assembly 120' again includes a recovery unit 122' having a sleeve 123' with a proximal end 124' and an oppositely disposed distal end 126'. A recovery unit 122' in at least one embodiment comprises an elongated configuration between the proximal end 124' and the oppositely disposed distal end 126'.

As before, a sleeve 123' of a recovery unit 122' in at least one embodiment is constructed of a flexible material, so as to accommodate a wide variety of containers having different configurations and sizes. By way of example only, a sleeve 123' of a recovery unit 122' may be constructed of the fabric such as cotton, polyester, nylon, etc., just to name a few. In at least one further embodiment, a sleeve 123' of a recovery unit 122' is constructed of a resilient or elastic material, once again, so as to accommodate a wide variety of containers having different configurations and sizes. More in particular, a sleeve 123' of a recovery unit 122' may be constructed of rubber, silicone, nitrile, neoprene and/or vinyl, once again, just to name a few.

A recovery unit 122' of the present viscous material recovery system 100' includes a proximal opening 125' disposed along a proximal end 124' thereof. More in particular, in at least one embodiment a proximal opening 125' of a recovery unit 122' is dimensioned and configured to receive a container C, having an amount of viscous material VM therein, therethrough and into the distal end 126' of the recovery unit 122' proximate a distal edge 127' thereof.

Having now disclosed the components of the alternative illustrative embodiment of a viscous material recovery system 100' in accordance with the present invention, operation thereof shall be described. To begin, a user places a container C having an amount of viscous material VM agglomerated proximate a container bottom CB through a proximal end opening 125' in a proximal end 124' of a recovery unit 122' with the container neck CN having the container cap CC secured therearound operatively positioned downwardly into the distal end 126' of the recovery unit 122', such as is shown best in the illustrative embodiment of FIG. 6.

Once the container C having the viscous material VM therein is operatively positioned into the recovery unit 122', as shown best in FIG. 6, a user grasps one end of the present viscous material recovery system 100'. Similar to operation of the viscous material recovery system 100 as described hereinabove with reference to the illustrative embodiment of FIG. 2, the user grasps the proximal end 124' of the recovery unit 122' and spins the recovery unit 122', and thus, the container C with the viscous material VM therein, along and around a circular path for about 10 revolutions to about 15 revolutions. As before, it is to be appreciated that the number of revolutions necessary for transfer the amount of viscous material VM which has agglomerated proximate a container bottom CB of a container C towards the container neck CN will be dependent upon the amount and viscosity of the viscous material VM in the container C.

After spinning the recovery unit 122' having the container C with the viscous material VM agglomerated proximate the container bottom CB therein along and around a circular path for a sufficient number of revolutions, the viscous material VM is transferred from the container bottom CB towards the container opening CO of the container neck CN, as is shown best in the illustrative embodiment of FIG. 7. The container C is then removed from the recovery unit 122', and the user simply removes the container cap CC from the container C such that the viscous material may be dispensed through the container opening CO through the container neck CN as needed during use.

Figure 8:
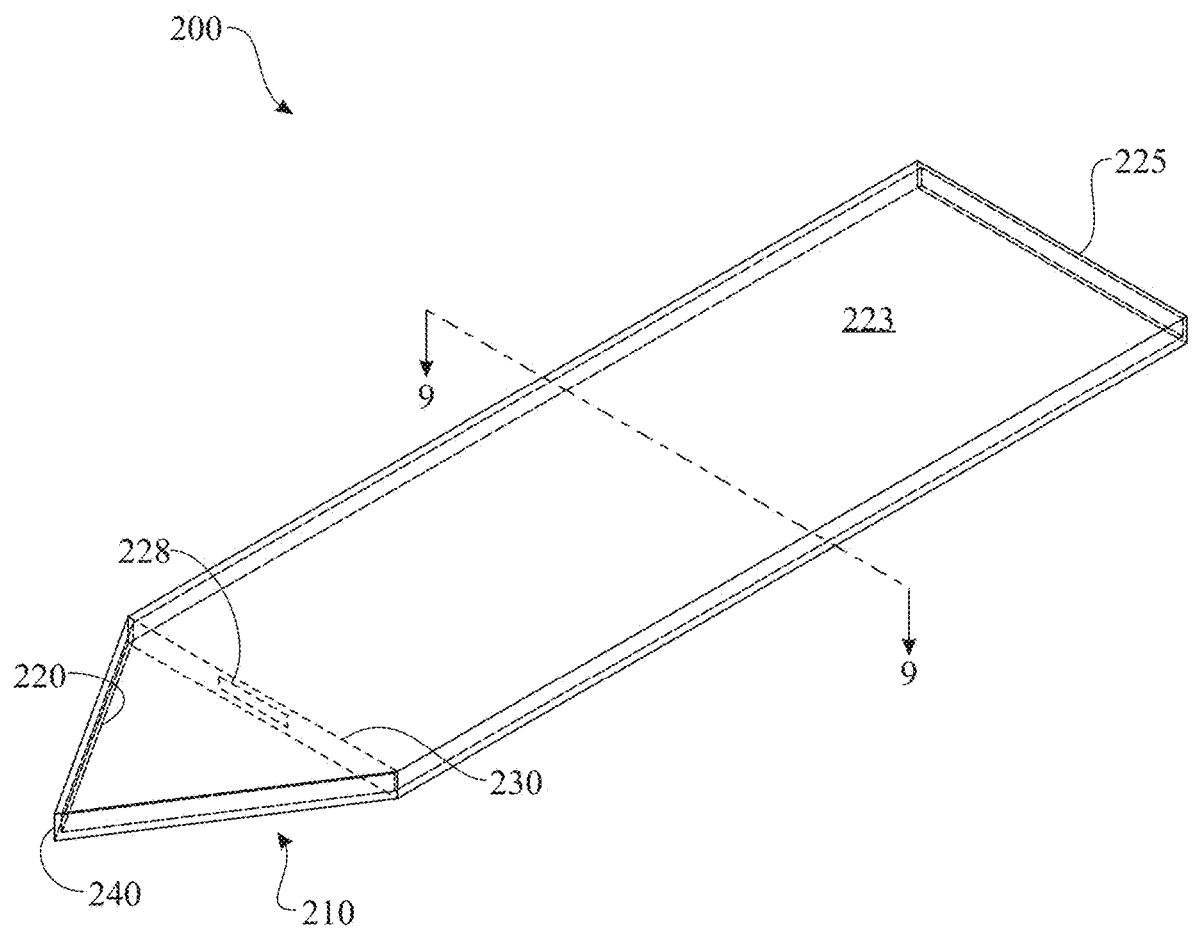
FIG. 8 presents a perspective view of a viscous material recovery system of having a collection assembly and a recovery assembly as a single structural component, in accordance with a second embodiment of the present invention.
Figure 9:
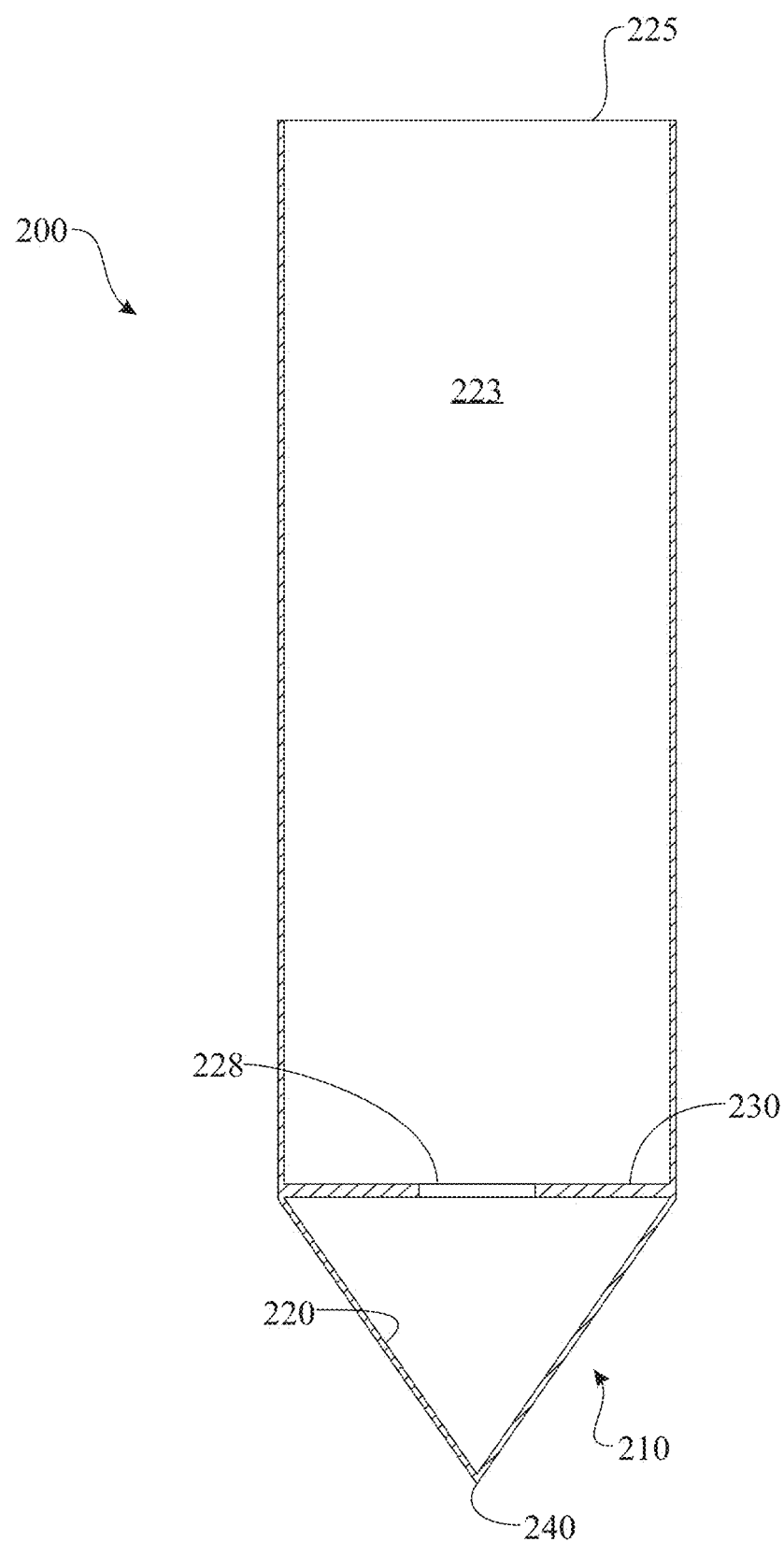
FIG. 9 presents a cross-sectional view of the viscous material recovery system of FIG. 8, in accordance with the second embodiment of the present invention.
Figure 10:
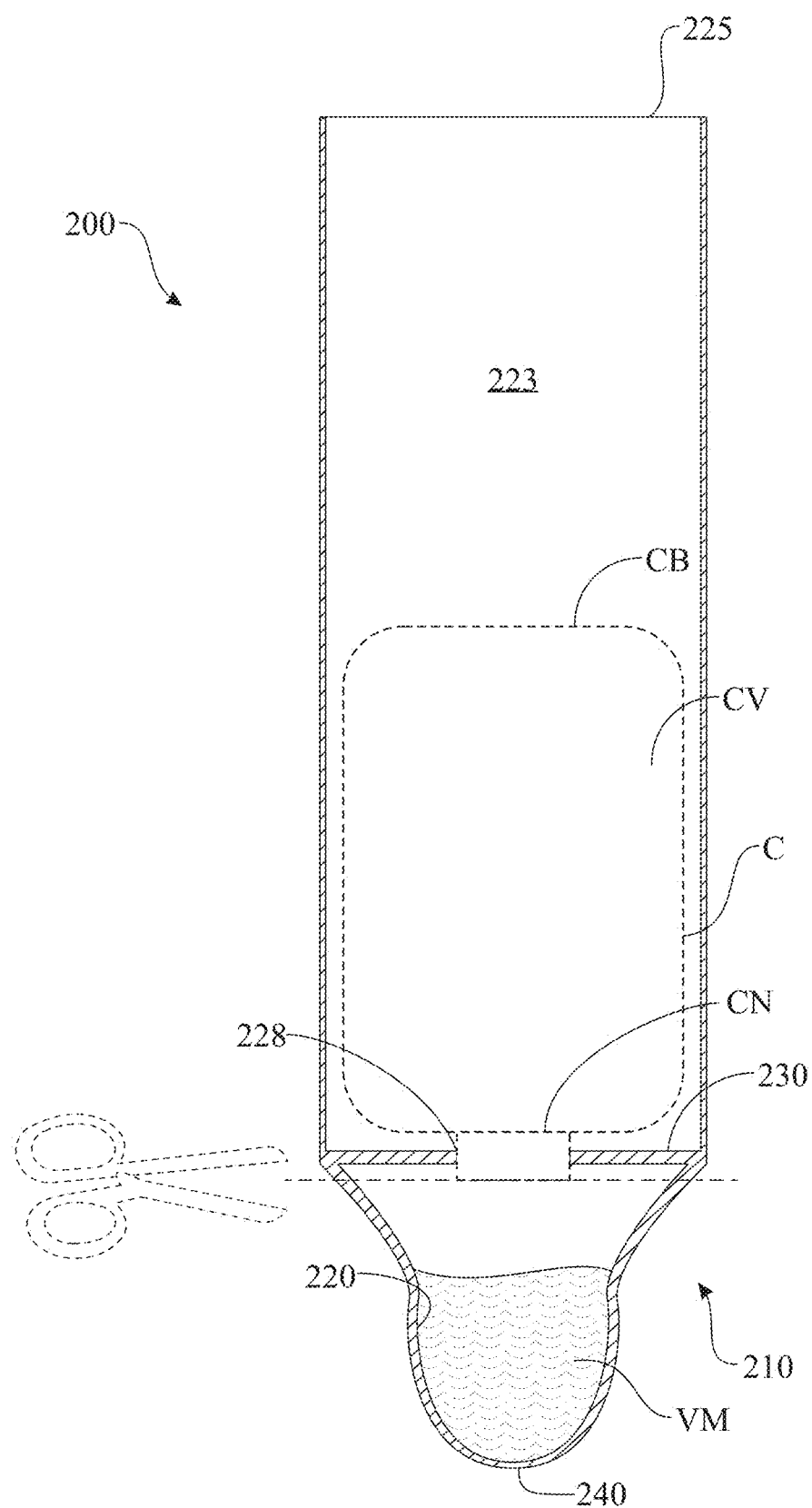
FIG. 10 presents a perspective view of a collection assembly of the viscous material recovery system of FIG. 8 showing the viscous material showing the viscous material transferred into a bag after operation thereof by the user, in accordance with the second embodiment of the present invention.

In yet another alternative embodiment, as best shown in FIGS. 8-10, the present invention proposes a unified collection and recovery mechanism, designated as system 200. The system 200 essentially combines the functions of the collection assembly 110 and recovery assembly 120 into a singular, integrated structural component. This design mirrors the aesthetic and form factor of the collection assembly 110. The system 200 includes a sleeve 223 configured to receive a container C at the proximal end 225.

The key feature of system 200 is its bag structure 210. The bag 210 is engineered to accommodate a container C through an aperture 228 from the sleeve 223 when the container C is turned upside down, reminiscent of the manner in which collection assembly 110 would receive the container C, such that a viscous material VM is transferred from a container bottom CB towards a container opening CO of a container neck CN. The container neck CN containing the viscous material VM is directly inserted into bag 210.

Once the container C is suitably positioned within system 200, a user can employ a swinging or rotational motion. This action ensures that the viscous material VM vacates the bottle and gathers at the bottom of bag 210. To enhance the efficiency of this process, the interior surface of bag 210, denoted as 220, may be crafted with specific textures or lining to aid the movement of the viscous material.

After ensuring the complete transfer of the viscous material, the container C can be removed from system 200 the same way the container C enters the system, through the proximal end 225. The design of bag 210 may incorporate a sealing mechanism 230. This mechanism allows a user to securely seal off the content within the bag once the transfer is complete. For the retrieval of the viscous material VM, the bottom part of bag 210 is fashioned with a dispensing end 240. A user may slice off or open this dispensing end 240 for a smooth flow and application of the material.

This alternate embodiment, exemplified by system 200, highlights the essence of the invention in the absence of a distinct recovery assembly 120, underlining the innovative versatility of the design. Incorporating such an embodiment ensures users have an expansive range of apparatus choices when dealing with viscous materials.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A viscous recovery material system comprising:
   a recovery unit structured to receive a container;
   the recovery unit having a sleeve with a proximal end and an oppositely disposed distal end, wherein the sleeve is configured to allow rotational movement of the container positioned therein, facilitating the transfer of viscous material from the container;
   a collection unit operatively connected to the recovery unit or integrally formed therewith;
   the collection unit further comprising: a collection reservoir to receive and store the viscous material from the container, with the collection unit including a container receiving end and a dispensing end; wherein
   the system is operable such that upon a user-induced spinning or swinging motion, the viscous material within the container is directed and transferred into the collection reservoir.

2. The viscous material recovery system of claim 1, wherein the dispensing end of the collection unit is detachable to enable the dispensation of the viscous material.

3. The viscous material recovery system of claim 1, further comprising a container cap structured to secure the container opening.

4. The viscous material recovery system of claim 1, wherein the recovery unit includes a distal aperture formed through the oppositely disposed distal end for the insertion or removal of the container.

5. The viscous material recovery system of claim 1, wherein the collection reservoir has an interior surface textured to facilitate the movement of the viscous material.

6. The viscous material recovery system of claim 1, wherein the recovery unit is elongated between the proximal end and the oppositely disposed distal end.

7. The viscous material recovery system of claim 1, wherein the collection unit is constructed from a resilient or elastic material to accommodate containers of varying sizes and configurations.

8. The viscous material recovery system of claim 1, wherein the recovery unit is constructed such that, upon user-induced motion, the viscous material is transferred from a container bottom towards a container neck.

9. The viscous material recovery system of claim 1, wherein the recovery unit is configured to position the container neck downwardly into the distal end of the recovery unit.

10. The viscous material recovery system of claim 1, wherein the collection unit is configured to hold the viscous material without requiring a distinct recovery assembly.

11. The viscous material recovery system of claim 1, wherein the system is structured to facilitate the complete transfer of viscous material from the container to the collection reservoir without leaving significant remnants within the container.

12. The viscous material recovery system of claim 1, wherein the sleeve of the recovery unit is constructed of a flexible material to accommodate containers of varying configurations and sizes.

13. The viscous material recovery system of claim 12, wherein the flexible material comprises one or more selected from the group consisting of: cotton, polyester, nylon, rubber, silicone, nitrile, neoprene, and vinyl.

14. The viscous material recovery system of claim 1, wherein the container receiving end structured to form a closure after receiving viscous material.

15. The viscous material recovery system of claim 14, wherein the closure is formed by tying a knot between the container receiving end and the collection reservoir.

16. A viscous recovery material system comprising:
a recovery unit structured to receive a container;
the recovery unit having a sleeve with a proximal end and an oppositely disposed distal end, wherein the sleeve is configured to allow rotational movement of the container positioned therein, facilitating the transfer of viscous material from the container, and further wherein the sleeve of the recovery unit is constructed of a flexible material to accommodate containers of varying configurations and sizes;
the flexible material comprising one or more selected from the group consisting of: cotton, polyester, nylon, rubber, silicone, nitrile, neoprene, and vinyl;
a collection unit operatively connected to the recovery unit or integrally formed therewith;
the collection unit further comprising: a collection reservoir to receive and store the viscous material from the container, with the collection unit including a container receiving end and a dispensing end; wherein
the system is operable such that upon a user-induced spinning or swinging motion, the viscous material within the container is directed and transferred into the collection reservoir.

17. A viscous recovery material system comprising:
a recovery unit structured to receive a container;
the recovery unit having a sleeve with a proximal end and an oppositely disposed distal end, wherein the sleeve is configured to allow rotational movement of the container positioned therein, facilitating the transfer of viscous material from the container, and further wherein the sleeve of the recovery unit is constructed of a flexible material to accommodate containers of varying configurations and sizes;
the flexible material comprising one or more selected from the group consisting of: cotton, polyester, nylon, rubber, silicone, nitrile, neoprene, and vinyl;
a collection unit operatively connected to the recovery unit or integrally formed therewith;
the collection unit further comprising: a collection reservoir to receive and store the viscous material from the container, with the collection unit including a container receiving end and a dispensing end, the container receiving end structured to form a closure after receiving viscous material; wherein
the system is operable such that upon a user-induced spinning or swinging motion, the viscous material within the container is directed and transferred into the collection reservoir and the closure is formed by tying a knot between the container receiving end and the collection reservoir.

* * * * *